United States Patent [19]

Phillips

[11] Patent Number: 4,717,292

[45] Date of Patent: Jan. 5, 1988

[54] DRILL BIT

[75] Inventor: John A. Phillips, Balsham, England

[73] Assignee: Dom Holdings PLC, United Kingdom

[21] Appl. No.: 45,713

[22] Filed: May 6, 1987

Related U.S. Application Data

[63] Continuation of Ser. No. 785,502, Oct. 8, 1985, abandoned.

[30] Foreign Application Priority Data

Oct. 8, 1984 [GB] United Kingdom ................. 8425400

[51] Int. Cl.⁴ .............................................. B23B 51/00

[52] U.S. Cl. .................................... 408/226; 279/1 B; 279/75

[58] Field of Search ................ 175/260, 261; 279/1 B, 279/22, 30, 75; 408/226, 239 R, 239 A, 240

[56] References Cited

U.S. PATENT DOCUMENTS

| | | | |
|---|---|---|---|
| 2,652,738 | 9/1953 | Carlson | 279/30 |
| 3,637,225 | 1/1972 | Schmuck | 408/226 |
| 3,702,705 | 11/1972 | Schadlich | 279/1 B |
| 3,943,986 | 3/1976 | Lejdegard | 408/226 |
| 4,107,949 | 8/1978 | Wanner et al. | 279/75 |
| 4,209,182 | 6/1980 | Sheldon | 279/75 |
| 4,502,824 | 3/1985 | Dohse et al. | 279/1 B |

FOREIGN PATENT DOCUMENTS

| | | | |
|---|---|---|---|
| 878588 | 7/1949 | Fed. Rep. of Germany | 279/30 |
| 341412 | 1/1931 | United Kingdom . | |
| 804110 | 11/1958 | United Kingdom . | |
| 1434173 | 5/1976 | United Kingdom . | |
| 1521839 | 8/1978 | United Kingdom . | |
| 2005572A | 4/1979 | United Kingdom . | |
| 1584318 | 2/1981 | United Kingdom . | |
| 2109287 | 6/1983 | United Kingdom . | |

*Primary Examiner*—Robert L. Spruill
*Assistant Examiner*—Donald R. Studebaker
*Attorney, Agent, or Firm*—Shapiro and Shapiro

[57] ABSTRACT

A tool such as a drill has a cylindrical shank for insertion in a tool holder of a rotary percussive or other rotary machine, such as a drilling machine. The shank has a first surface extending transversely of the shank from a point of intersection with the periphery thereof and a second surface extending from the first surface at the end of the first surface remote from the point of intersection of the first surface with the periphery of the shank to a point of intersection with the periphery spaced from the point of intersection of the first surface with the periphery. There are two sets of first and second surfaces spaced apart on opposite sides of the longitudinal axis of the shank.

The first and second surfaces are flat. The second surfaces are radial and arranged on the same diameter. A plane through the longitudinal axis of the shank at substantially 90° to the first flat surfaces (which are parallel) is intermediate their respective points of intersection with the periphery and the ends from which the respective second flat surfaces extend. Each first flat surface thus provides a large, flat bearing for cooperation with an elongate driving member (a spline or rib) of the tool holder. Each set of first and second surfaces may have a third surface such that the two sets of surfaces define diametrically opposed rib or spline receiving grooves having a flat base and convergent sides.

13 Claims, 6 Drawing Figures

DRILL BIT

This is a continuation application of Ser. No. 785,502 filed Oct. 8, 1985, which is now abandoned.

The invention relates to a tool, particularly a tool for insertion in the tool receiver of a rotary percussive or other rotary machine, such as a drilling machine.

According to a first aspect of the invention there is provided a tool for insertion in the tool receiver of a rotary percussive or other rotary machine, comprising a shank, a first surface extending from a point of intersection with a boundary surface of the shank to a position along the length of the shank, and a second surface extending from or from near one longitudinal edge of the first surface at an obtuse angle and intersecting a further boundary surface of the shank, the arrangement being such that the second surface is adapted to. be drivingly engaged by an elongate driving means of the tool receiver in use.

According to a second aspect of the invention there is provided a tool for insertion in the tool receiver of a rotary percussive or other rotary machine, comprising a shank, a first surface extending transversely of the shank from a point of intersection with the periphery thereof, and a second surface extending away from the first surface at the end thereof remote from the point of intersection of the first surface with the periphery of the shank to a point of intersection with the periphery spaced from the first-mentioned point of intersection, the arrangement being such that the second-mentioned surface is adapted to be drivingly engaged by an elongate driving means of the tool receiver in use.

There may be two sets of first and second surfaces spaced apart on opposite sides of the longitudinal axis of the shank.

Each first surface may be substantially flat.

Each second surface may be substantially flat.

The angle between respective first and second surfaces may be in the range 100° to 110°45′.

A plane through the centre of the shank at substantially 90° to each first flat surface may be intermediate the point of intersection of each first surface with the periphery of the shank and the end from which the respective second surface extends.

The shank may be cylindrical and each second surface may be a radial surface.

The two sets of first and second surfaces may be spaced apart on opposite sides of the longitudinal axis of the shank.

The second flat surfaces may lie on a diameter of the shank.

The angle between each first and second surface may be 110°30′.

In one construction there may be a third surface extending from or from near a longitudinal edge of the first surface opposite the one edge from which the second surface extends, and the second and third surfaces may converge as considered in a direction towards the interior of the shank.

The second and third surface may each terminate in a curved part at the boundary surface of the shank.

The radius of the curved part may be about 0.5 mm.

The width of the first surface may be about 3.00 mm.

The first surface may terminate at said position remote from the boundary surface in a configuration which is concave.

The first surface may terminate in a quadrant shaped surface at an end thereof remote from an end of the shank.

There may be means providing a seat for a locking member of the tool receiver in use.

The seat providing means may comprise a blind elongate surface groove between the first and second surface.

There may be two diametrically opposed blind elongate surface grooves.

There may also be a further circumferential groove adjacent an end of the shank which is to be inserted in the tool receiver.

The further groove may be arcuate.

The radius of the arc may be about 6.80 mm.

The end of the shank inserted in use in the tool holder may be chamfered.

According to a third aspect of the invention, there is provided apparatus comprising a tool as hereinbefore defined, and a rotary percussive or other rotary machine, the tool being received by the tool receiver of the machine with an elongate driving means of the tool receiver in driving engagement with each second surface, for transferring rotary drive from the machine to the tool.

Tools embodying the invention are hereinafter described, by way of example, with reference to the accompanying drawings.

Figure 1:
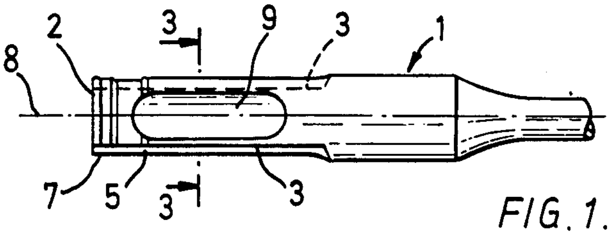
FIG. 1 is a side elevation of one tool according to the invention.
Figure 2:
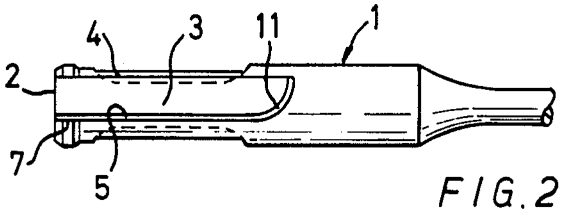
FIG. 2 is a side elevation of the tool of FIG. 1, rotated through 90°.
Figure 3:
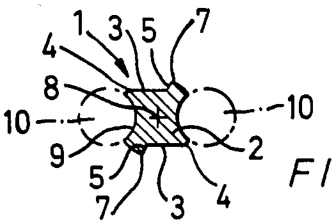
FIG. 3 is a transverse sectional view of the shank of the tool on line 3—3 of FIG. 1.

Referring to FIGS. 1—3 of the drawings, the tool 1 shown is a drill which has a cylindrical shank 2 for insertion in a tool holder of a rotary percussive or other rotary machine, such as a drilling machine. The shank 2 has a first surface 3 extending transversely of the shank 2 from a point of intersection 4 with the periphery thereof and a second surface 5 extending from the first surface 3 at the end thereof remote from the point of intersection 4 of the first surface 3 with the periphery of the shank 2 to a point of intersection 7 with the periphery spaced from the point of intersection 4 of the first surface 3 with the periphery. There are two sets of first and second surfaces 3 and 5 spaced apart on opposite sides of the longitudinal axis 8 of the shank 2.

The first and second surfaces 3 and 5 are flat. The second surfaces 5 are radial and arranged on the same diameter. A plane through the longitudinal axis 8 of the shank 2 at substantially 90° to the first flat surfaces 3 (which are parallel) is intermediate their respective points of intersection 4 with the periphery and the ends from which the respective second flat surfaces 5 extend. Each first flat surface 3 thus provides a large, flat bearing for cooperation with an elongate driving member such as a spline or rib (not shown) of the tool holder (also not shown).

The angle between a first flat surface 3 and a respective second flat 5 surface is 110°30′±15′, for optimum driving engagement with the spline or rib which is of wedge shape.

The shank 2 also has opposite blind elongate surface grooves 9, between the sets of first and second surfaces 3 and 4 which receive spherical or cylindrical locking members 10.(shown dashed) of the tool holder when the tool 1 is inserted in the tool holder. When so inserted the ribs or splines slide along the first flat surfaces 3 and engage the second flat surfaces 5 so that on rotation of the tool holder torque is transmitted to the shank 2, and then to the tool 1, through the second flat surfaces 5. The wide and uninterrupted expanse of first flat surfaces 3 (which terminates in a rounded or quadrant shaped end 11 inboard of the shank) ensures that there is always positive alignment and easy insertion even when the ribs or splines of the holder, or the second flat surfaces 5 become worn, bent or deformed.

Figure 4:
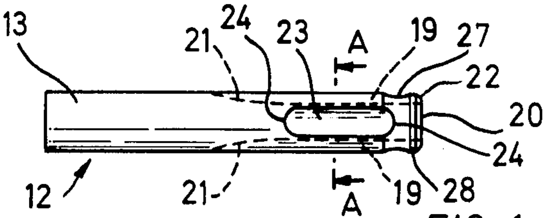
FIG. 4 is a side elevation of a second tool according to the invention.
Figure 5:
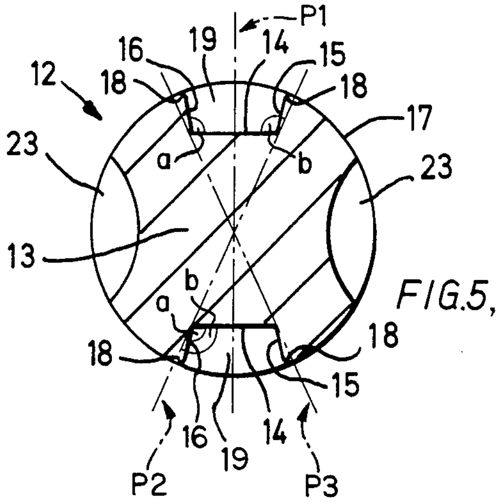
FIG. 5 is a transverse sectional view on line A—A of FIG. 4, and enlarged with respect thereto.
Figure 6:
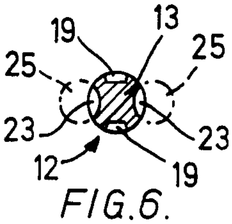
FIG. 6 shows a cross-section of the tool, in use, and to the same scale as that of FIG. 4.

Referring now to FIGS. 4, 5 and 6, the tool 12 shown is a drill bit which has a cylindrical shank 13 for insertion in a tool holder of a rotary percussive or other rotary machine, such as a drilling machine.

The shank 13 has two diametrically opposite sets of first, second, and third surfaces 14,15,16. The first surfaces 14 are flat and substantially parallel to one another, each being perpendicular to a diametrical plane P1 through the shank 13. As is most clearly seen in FIG. 5, the second and third surfaces 15,16 extend divergently from opposite lateral edges of each base surface 14 to the boundary surface 17 of shank 13. Each second and third surface 15,16 forms a relatively small obtuse angle a with the corresponding base surface 14. This angle a is smaller than an angle b formed by a diametrical plane P2 or P3 that intersects the lateral edge of the base surface 14 from which the respective second or third surface extends.

The free ends of each second and third surfaces 15 and 16 terminate in a convex part 18 of radius 0.5 mm.

The respective sets of first, second and third surfaces 14,15,16 each define a groove 19 which extends from a boundary surface defining one end 20 of the shank 13, longitudinally away from end 20 and terminating in a shallow curve 21 which intersects with the cylindrical boundary surface 17 of the shank 13.

The shank 13 has a chamfered part 22 extending between the surface 17 to the surface of end 20. There is also means providing a seat for a locking member of the tool receiver. This means comprises a pair of diametrically opposed elongate blind slots 23 (situated on a diameter at 90° to that on which the opposite grooves 19 are located). Each slot 23 has opposite semi-circular ends 24, and receives in use a ball 25, as shown in dashed lines in FIG. 6. The locking means also includes a peripheral groove 27 adjacent the end 20. The groove 27 is arcuate, of radius 6.80 mm and it intersects grooves 19 adjacent the end 20.

In use the chamfered end 20 of the tool is inserted in the tool receiver so that the balls 25 engage in the slots 23 and a further ball or balls engage in the groove 27. The balls are spring mounted so that they can move out of the way of the tool as it is inserted, and spring into position in respective grooves when the tool is in position. The balls likewise move out of position to allow the tool to be removed from the tool receiver, the curved ends 24 and the curve of the groove 27 gradually easing the balls out of engagement to release the tool. The chamfered surface 22 aids in insertion and in urging the ball(s) to engage in groove 27 radially outwards prior to snapping over part 28 into the groove 27.

Driving ribs or splines (not shown) of the tool receiver engage in the grooves 19, the curved parts 18 of the second and third surfaces 15 and 16, facilitating entry thereof. The ribs or splines then engage at least one of the second or third surfaces for driving the tool 12 about its longitudinal axis. Driving torque is thus transmitted to the tool through the ribs or splines and the tool is positive driven, either clockwise or counterclockwise.

I claim:

1. A drill bit for insertion into a tool receiver of a rotary percussive drilling machine, said drill bit comprising a generally cylindrical shank portion and a working portion extending axially from one end of said shank portion, said shank portion having two substantially opposed peripheral longitudinal grooves each open at a free end of said shank portion, each groove having a substantially flat base surface recessed from the cylindrical periphery of said shank portion and two non-radial sidewalls diverging outwardly from opposite lateral edges of said base surface toward the cylindrical periphery of said shank portion, each sidewall forming a small obtuse angle with said base surface which is smaller than an angle formed with said base surface by a diametrical plane that intersects the lateral edge of said base surface from which that sidewall extends.

2. A drill bit according to claim 1, wherein said grooves are disposed at diametrically opposite locations of said shank portion.

3. A drill bit according to claim 2, wherein the respective base surfaces of said grooves are substantially parallel.

4. A drill bit according to claim 1, wherein an end of each base surface remote from said free end of said shank portion curves gradually outward of said shank portion to intersect the cylindrical periphery of said shank portion.

5. A drill bit according to claim 1, wherein each of said sidewalls has a curved portion which intersects the cylindrical periphery of said shank portion.

6. A drill bit according to claim 5, wherein said curved portion has a radius of about 0.5 mm.

7. A drill bit according to claim 5, wherein each base surface has a width of about 3 mm.

8. A drill bit according to claim 1, wherein said shank portion has at least one recessed seat for receiving a locking member of the tool receiver, said seat being in the form of an elongate blind groove circumferentially displaced from said longitudinal grooves.

9. A drill bit according to claim 8, wherein said shank portion has a circumferential groove adjacent said free end of said shank portion for receiving another locking member of the tool receiver.

10. A drill bit according to claim 9, wherein said circumferential groove is arcuate, with an arc radius of about 6.8 mm.

11. Apparatus comprising a drill bit according to claim 1, and a rotary percussive drilling machine, said shank portion of said drill bit being received in a tool receiver of said machine with elongate driving members of the tool receiver being in driving engagement with the respective sidewalls of said two longitudinal grooves for transferring rotary driving motion from said drilling machine to said drill bit.

12. A drill bit for insertion into a tool receiver of a rotary percussive drilling machine, said drill bit comprising a generally cylindrical shank portion and a working portion extending axially from one end of said shank portion, said shank portion having at least one peripheral longitudinal groove open at a free end of said shank portion, said groove having a substantially flat base surface recessed from the cylindrical periphery of said shank portion and two non-radial sidewalls diverging outwardly from opposite lateral edges of said base surface toward the cylindrical periphery of said shank portion, each sidewall forming a small obtuse angle with said base surface which is smaller than an angle formed with said base surface by a diametrical plane that intersects the lateral edge of said base surface from which that sidewall extends.

13. A drill bit according to claim 12, wherein said base surface is perpendicular to a diametrical plane of said shank portion.

* * * * *